United States Patent
Li et al.

(10) Patent No.: US 11,748,352 B2
(45) Date of Patent: Sep. 5, 2023

(54) DYNAMICAL DATABASE SYSTEM RESOURCE BALANCE

(71) Applicant: International Business Machines Corporation, Armonk, NY (US)

(72) Inventors: Shuo Li, Beijing (CN); Xiaobo Wang, Beijing (CN); Meng Wan, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 17/412,389

(22) Filed: Aug. 26, 2021

(65) Prior Publication Data

US 2023/0065855 A1  Mar. 2, 2023

(51) Int. Cl.
| | | |
|---|---|---|
| *G06F 16/00* | (2019.01) | |
| *G06F 16/2453* | (2019.01) | |
| *G06F 11/34* | (2006.01) | |
| *G06F 16/22* | (2019.01) | |
| *G06N 20/00* | (2019.01) | |
| *G06F 18/214* | (2023.01) | |
| *G06F 16/242* | (2019.01) | |
| *G06F 16/24* | (2019.01) | |

(52) U.S. Cl.
CPC .... *G06F 16/24549* (2019.01); *G06F 11/3433* (2013.01); *G06F 16/2228* (2019.01); *G06F 16/24* (2019.01); *G06F 16/2423* (2019.01); *G06F 16/2445* (2019.01); *G06F 18/214* (2023.01); *G06N 20/00* (2019.01)

(58) Field of Classification Search
CPC .... G06F 16/24; G06F 16/242; G06F 16/2423; G06F 16/2425; G06F 16/2428; G06F 16/2445; G06F 16/245; G06F 16/2453; G06F 16/24534; G06F 16/2228
See application file for complete search history.

(56) References Cited

U.S. PATENT DOCUMENTS

| | | | | |
|---|---|---|---|---|
| 6,901,398 B1 * | 5/2005 | Horvitz | ................ | G06Q 10/107 |
| | | | | 707/999.005 |
| 7,051,037 B1 * | 5/2006 | Thomas | .............. | G06F 16/2465 |
| | | | | 707/999.102 |

(Continued)

FOREIGN PATENT DOCUMENTS

| | | | |
|---|---|---|---|
| EP | 1111516 A3 * | 1/2003 | |
| EP | 1519283 B1 * | 8/2011 | |

(Continued)

OTHER PUBLICATIONS

H. Hacigumus et al., "Providing database as a service", Proceedings 18th International Conference on Data Engineering, Aug. 2002, pp. 1-10.*

(Continued)

*Primary Examiner* — Srirama Channavajjala
(74) *Attorney, Agent, or Firm* — Van Leeuwen & Van Leeuwen; Matthew C. Zehrer

(57) ABSTRACT

An approach is provided in which the approach segments each one of multiple components corresponding to multiple component levels in an SQL database system into multiple functions. The approach combines a first one of the multiple functions with a second one of the multiple functions into an image, and invokes the image to process an SQL query using the first function and the second function.

14 Claims, 9 Drawing Sheets

(56) References Cited

U.S. PATENT DOCUMENTS

| | | | | |
|---|---|---|---|---|
| 7,401,094 | B1* | 7/2008 | Kesler | G06F 16/252 |
| | | | | 707/999.102 |
| 7,433,886 | B2* | 10/2008 | Rathakrishnan | G06F 16/289 |
| 9,020,929 | B2* | 4/2015 | Santosuosso | G06F 16/24565 |
| | | | | 707/718 |
| 9,189,523 | B2 | 11/2015 | Ganapathi | |
| 10,554,771 | B2* | 2/2020 | Park | H04L 67/535 |
| 10,558,554 | B2* | 2/2020 | Bhandarkar | G06F 11/3072 |
| 2005/0138015 | A1* | 6/2005 | Dageville | G06F 16/24549 |
| 2012/0311157 | A1* | 12/2012 | Erickson | G06F 9/541 |
| | | | | 709/226 |
| 2015/0286678 | A1 | 10/2015 | Casaletto | |
| 2020/0125568 | A1 | 4/2020 | Idicula | |
| 2020/0210387 | A1 | 7/2020 | Brown | |
| 2020/0401886 | A1* | 12/2020 | Deng | G06N 3/08 |
| 2021/0004691 | A1* | 1/2021 | Neumann | G16H 50/70 |
| 2021/0174238 | A1* | 6/2021 | Song | G06N 20/00 |

FOREIGN PATENT DOCUMENTS

| | | | |
|---|---|---|---|
| WO | WO2014144889 | A2 * | 9/2014 |
| WO | WO2016186975 | A1 * | 11/2016 |

OTHER PUBLICATIONS

Venkata Vamsikrishna Meduri et al., "Evaluation of Machine Learning Algorithms in Predicting the Next SQL QueryfromtheFuture", ACM Transactions on Database Systems Mar. 2021, vol. 46 Issue 1Article No. 4pp. 1-46.*

Haiyan Zhang et al., "SQL Injection Attack Principles and Preventive Techniques for PHP Site", CSAE '18: Proceedings of the 2nd International Conference on Computer Science and Application EngineeringOct. 2018 Article No. 187pp. 1-9.*

* cited by examiner

DYNAMICAL DATABASE SYSTEM RESOURCE BALANCE

BACKGROUND

Cloud computing is an on-demand availability of computer system resources, such as data storage (cloud storage) and computing power, without direct active management by a user. Large clouds often have functions distributed over multiple data center locations. Cloud computing relies on sharing of resources to achieve coherence and economies of scale and cloud providers typically use a "pay-as-you-go" model to assist in reducing capital expenses.

A cloud database is a database that typically runs on a cloud computing platform and access to the database is provided as-a-service. Two common deployment models are: 1) users run databases on the cloud independently using a virtual machine image; or 2) users purchase access to a database service that is maintained by a cloud database provider. Of the databases available on the cloud, some are SQL-based and some use a NoSQL data model.

Database services manage scalability and high availability of the database, and make the underlying software-stack transparent to the user. With a database as a service model, application owners are not required to install and maintain the database themselves. Instead, a database service provider is responsible for installing and maintaining the database. Database services also control the underlying database instances using a service API. The service API is exposed to the end user and permits users to perform maintenance and scaling operations on their database instances.

BRIEF SUMMARY

According to one embodiment of the present disclosure, an approach is provided in which the approach segments each one of multiple components corresponding to multiple component levels in an SQL database system into multiple functions. The approach combines a first one of the multiple functions with a second one of the multiple functions into an image, and invokes the image to process an SQL query using the first function and the second function.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
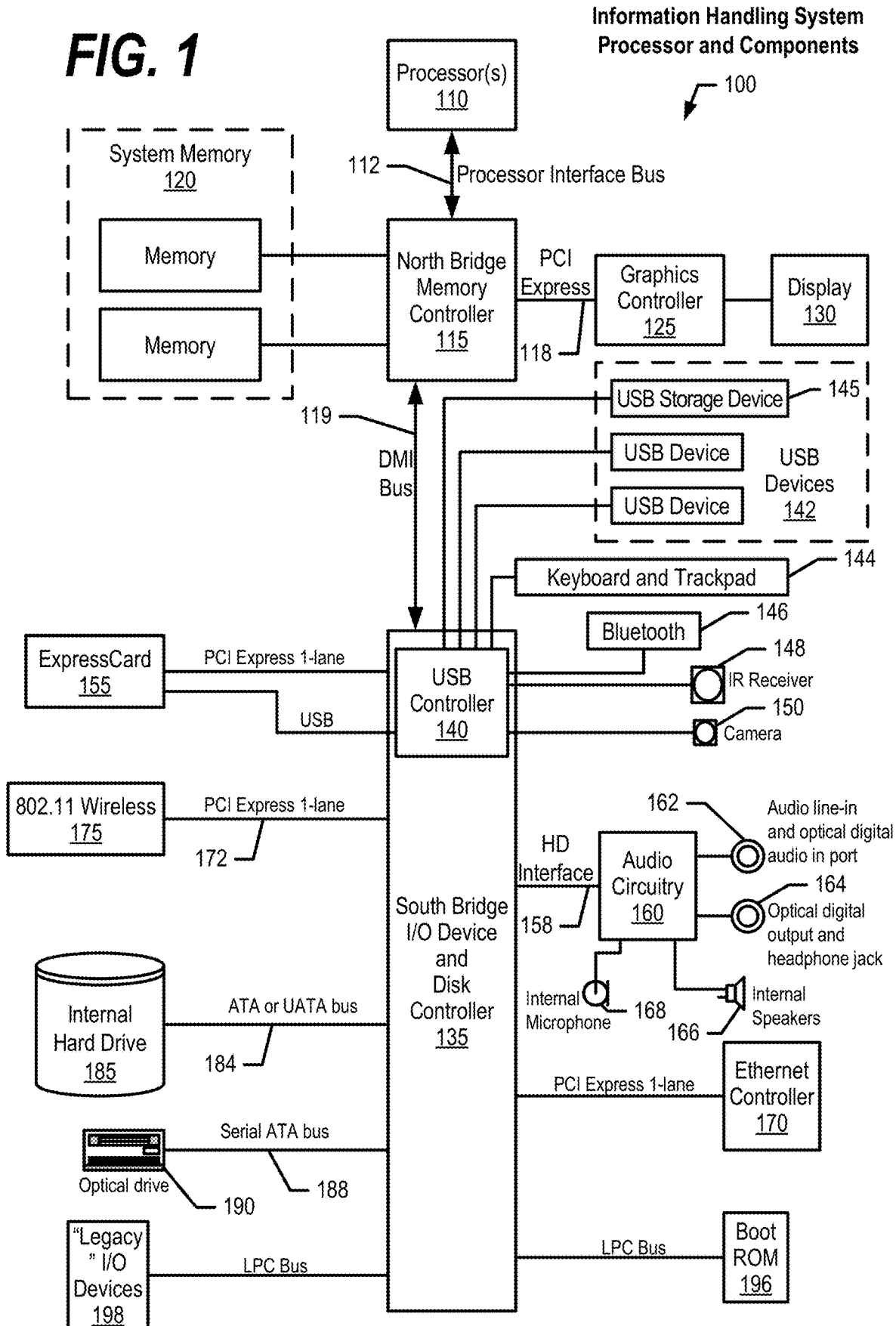
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
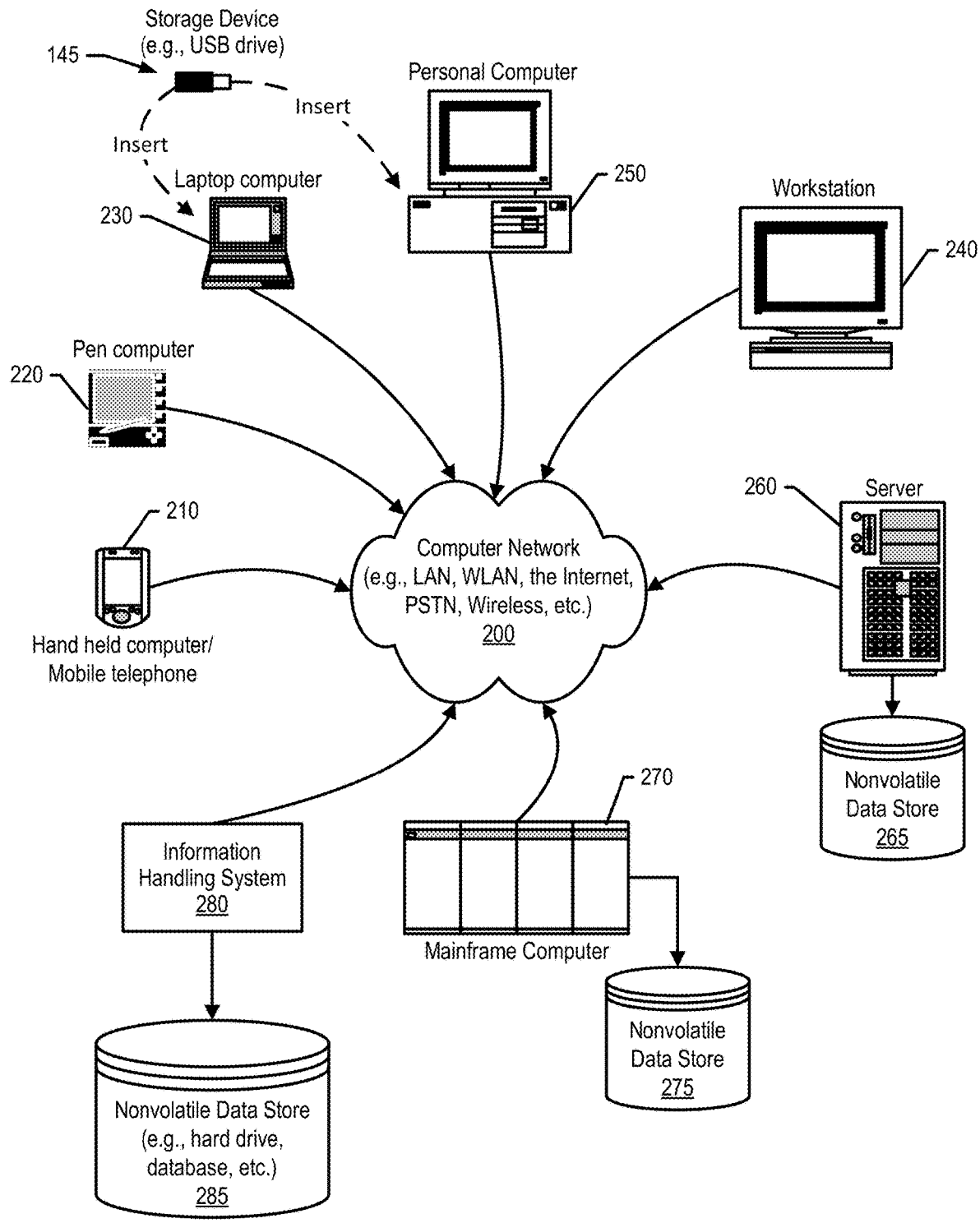
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, cloud computing, cloud databases, and database services provide advantages over traditional stand-alone computing approaches. A challenge found, however is that cloud databases are complex and have many dependency modules that run concurrently. As such, performing SQL queries on a cloud database requires a substantial amount of computing resources.

FIGS. 3 through 9 depict an approach that can be executed on an information handling system that divides database system components into multiple functions; builds the functions into images/bundled images; and loads the images/bundled images into containers for execution as needed. In one embodiment, the approach leverages an artificial intelligence (AI) predictable machine learning model and asynchronously pre-loads the images/bundled images to enhance performance base and optimize resource balance on historical image cluster analysis, SQL execution signatures probability, etc. In another embodiment, the approach bundles several images into a bundled image based on SQL workload patterns to optimize system performance and balance resources. As discussed herein, an image includes one or more functions, and a bundled image includes one or more images, each of which includes one or more functions. Also discussed herein, the term "image" may include both images and bundled images unless expressed otherwise.

Figure 3:
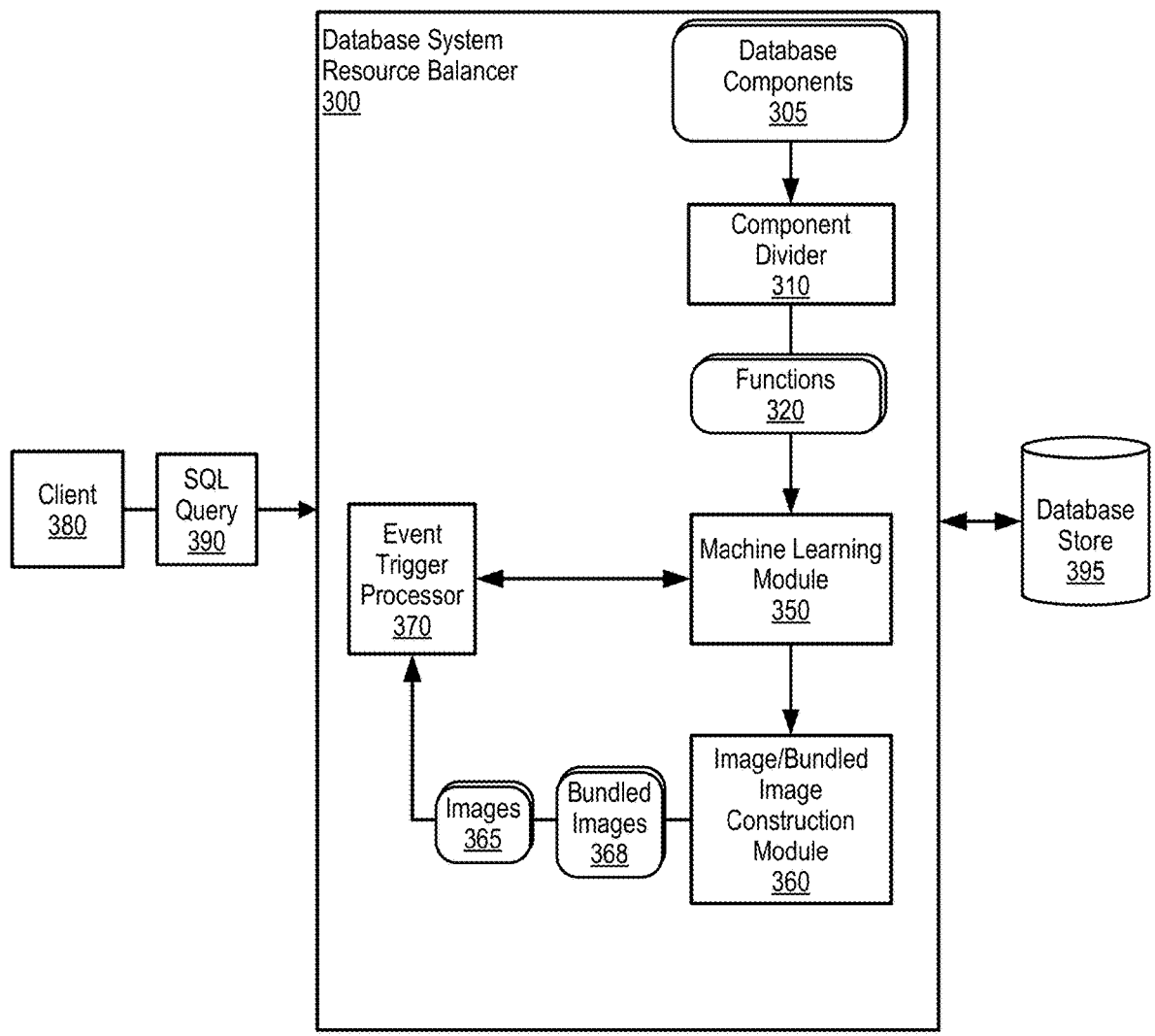
FIG. 3 is an exemplary diagram depicting a database system resource balancer dividing database system components into images and using the images to efficiently process SQL queries.

FIG. 3 is an exemplary diagram depicting a database system resource balancer dividing database system components into images and using the images to efficiently process SQL queries.

Database system resource balancer 300 includes component divider 310. Component divider 310 divides database components 305 into functions 320. In one embodiment, database components 305 include a Parser component, a Query Transformation component, an Access Path Selection component, a Runtime Execution component, and Index Manager components that include a data manager component and a buffer manager component (see FIG. 5 and corresponding text for further details).

Machine learning module 350 analyzes workload patterns and identifies functions to combine into images and possibly combine multiple images into bundled images based on workload pattern analysis to increase SQL query processing efficiency. In one embodiment, machine learning module 350 leverages AI (artificial intelligence) learning, such as using a Naive Bayes algorithm, from historical SQL executions about which functions in different component levels of the SQL facility structure should be triggered. In this embodiment, database system resource balancer 300 builds machine learning module 350 to predict which functions should be combined and preloaded during SQL execution time (see FIGS. 4 through 8 and corresponding text for further details).

Image/bundled image construction module 360 receives machine learning module 350's output and creates images 365 and/or bundled images 368, which are loaded into containers for execution to process SQL query 390 initiated by client 380 (discussed below). Image/bundled image construction module 360 1) instantiates one or more of functions 320 into a single image according to the output of machine learning module 350; and 2) bundles the images to a higher-level bundled image according to the output of machine learning module 350.

In one embodiment, database system resource balancer 300 collects SQL executions and parses the execution nodes into a bit map, which presents an active flag for the SQL execution facility nodes. Using the collected SQL execution facility nodes data, database system resource balancer 300 trains machine learning module 350 using the Naïve Bayes algorithm, then determines a model for predictable SQL facility node preload. Then, in this embodiment, database system resource balancer 300 uses image/bundled image construction module 360 to bundle the SQL facility nodes into several TCP/IP dual-channel communication middleware. The TCP/IP dual-channel communication middleware are controlled and preloaded by machine learning module 350 predictable results, which helps to inform which middleware should be called in the SQL execution time, thus database system resource balancer 300 saves substantial resources when processing SQL query 390 to retrieve data from database store 395.

Figure 4:
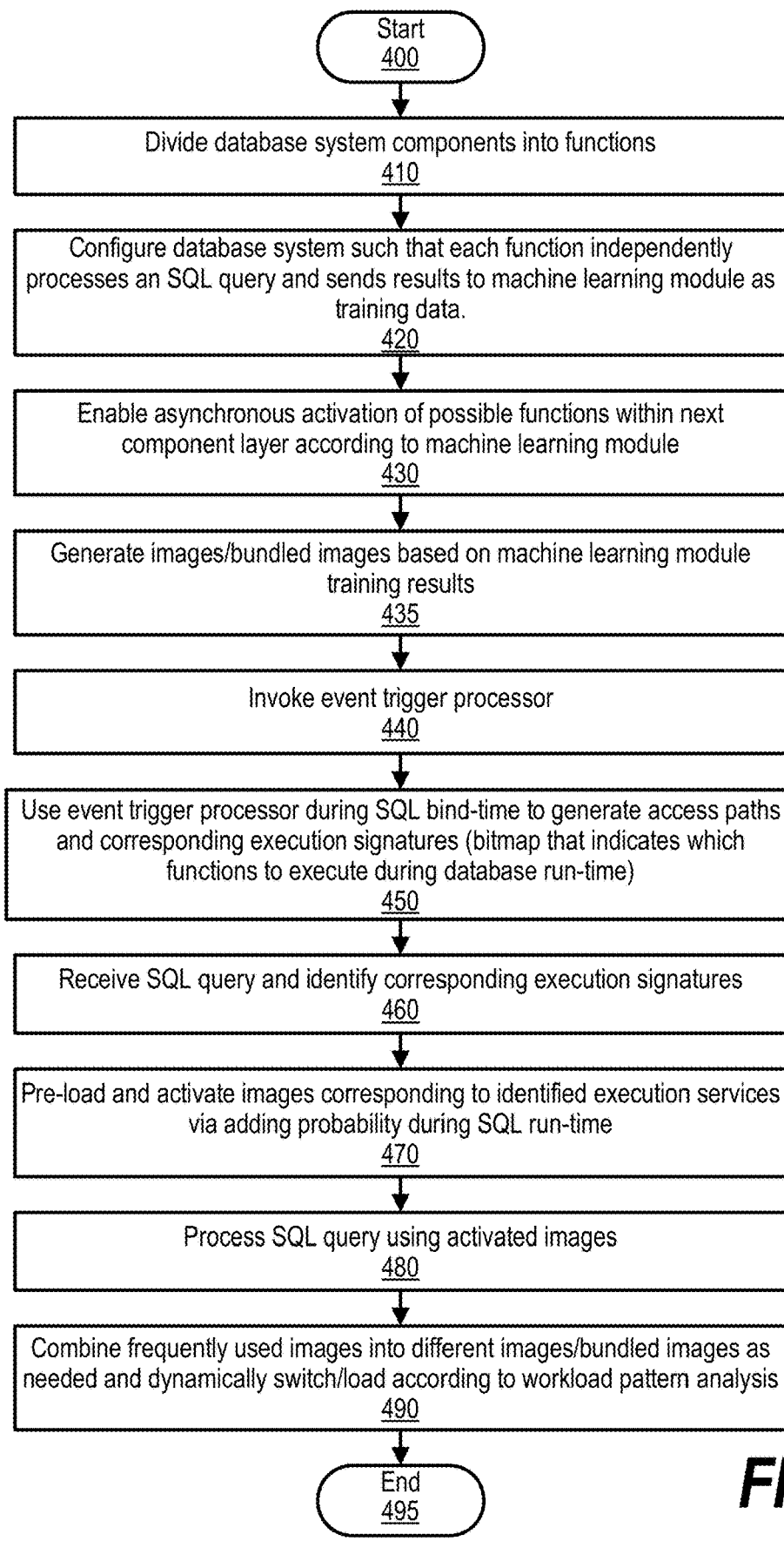
FIG. 4 is an exemplary flowchart showing steps taken to divide database system components into images and use the images independently to process and SQL query.

FIG. 4 is an exemplary flowchart showing steps taken to divide database system components into images and use the images independently to process and SQL query. FIG. 4 processing commences at 400 whereupon, at step 410, the process divides each one of database system components 305 into multiple functions (see FIG. 5 and corresponding text for further details).

At step 420, the process configures the database system such that each function independently processes an SQL query and sends results to machine learning module 350 as training data. At step 430, the process enables asynchronous activation of possible functions within next component layers according to machine learning module 350 (see FIG. 6 and corresponding text for further details). At step 435, the process generates images 365 and/or bundled images 368 based on the machine learning module training results.

At step 440, the process invokes event trigger processor 370 and, at step 450, the process uses event trigger processor 370 during SQL bind-time to generate access paths and corresponding execution signatures. The execution signatures are bitmaps that indicate which functions to execute during database run-time (see FIGS. 7, 8 and corresponding text for further details).

Figure 8:
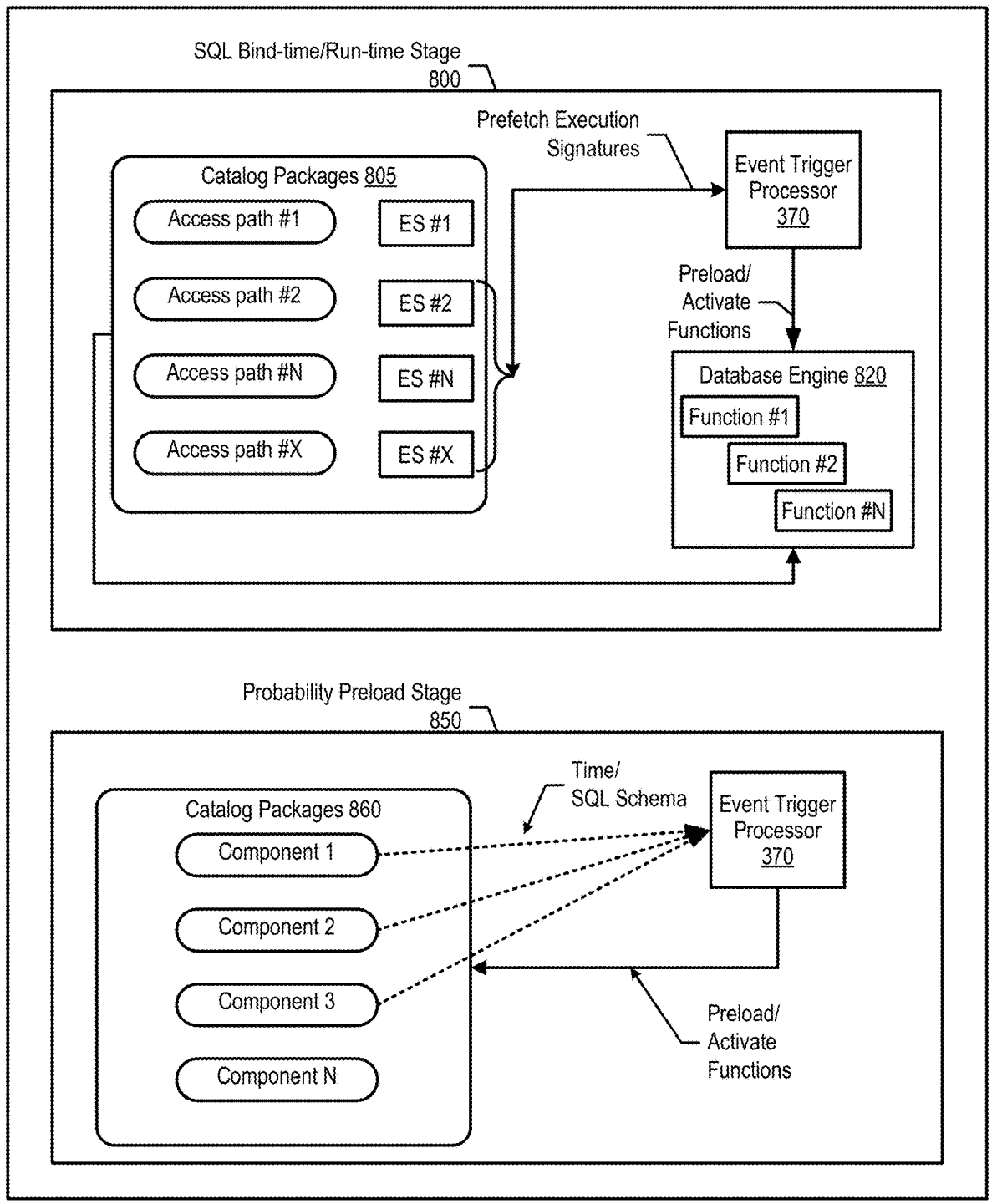
FIG. 8 Is an exemplary diagram depicting an SQL bind-time/run-time stage and a probability preload stage.

At step 460, the process receives SQL query 390 and identifies the execution signatures corresponding to SQL query 390 (see FIG. 8 and corresponding text for further details). At step 470, the process pre-loads and activates images 365 and/or bundled images 368 corresponding to the identified execution services via adding probability during SQL run-time (see FIG. 9 and corresponding text for further details). At step 480, the process uses the activated images 365 and/or bundled images 368 to process SQL query 390.

At step 490, the process analyzes results and combines frequently used functions into different images 365 and/or different bundled images 368 as needed. In one embodiment, the process dynamically switches/loads images/bundled images according to workload pattern analysis (see FIG. 9 and corresponding text for further details). FIG. 4 processing thereafter ends at 495.

Figure 5:
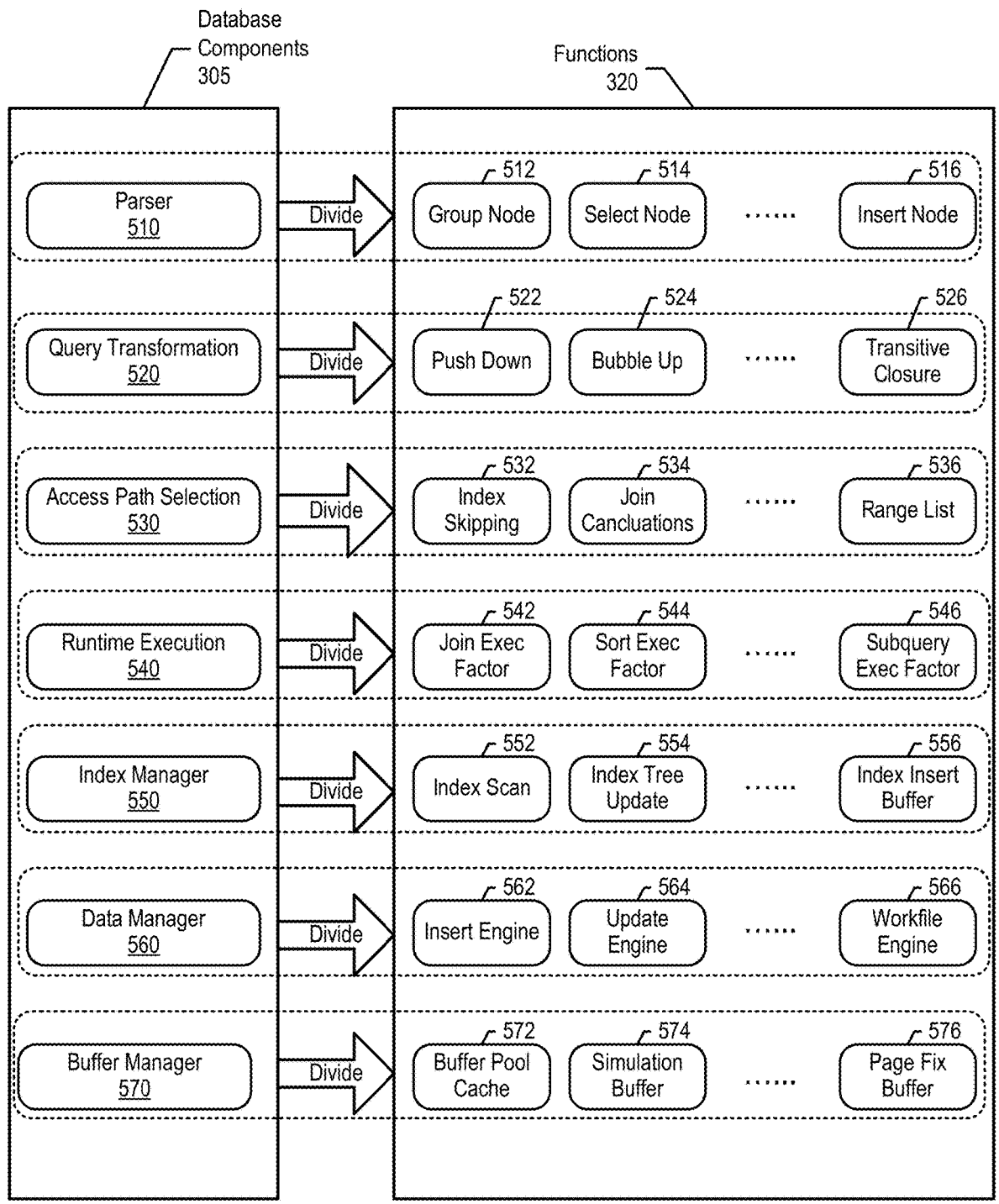
FIG. 5 is an exemplary diagram depicting database system resource balancer 300 dividing each of database components 305 into multiple functions 320.

FIG. 5 is an exemplary diagram depicting database system resource balancer 300 dividing each of database components 305 into multiple functions 320. Parser 510 divides into functions group node 512, select node 514, and insert node 516. Query transformation 520 divides into functions push down 522, bubble up 524, and transitive closure 526.

Access path selection 530 divides into functions index skipping 532, join calculations 534, and range lists 536. Runtime execution 540 divides into functions join execution factor 542, sort execution factor 544, and subquery execution factor 546. Index manager 550 divides into functions index scan 552, index tree update 554, and index insert buffer 556. Data manager 560 divides into functions insert engine 562, update engine 564, and workfile engine 566. Buffer manager 570 divides into functions buffer pool cache 572, simulation buffer 574, and page fix buffer 576. Then, database system resource balancer 300 combines various functions into images/bundled images based on machine learning module 350's prediction outputs.

Figure 6:
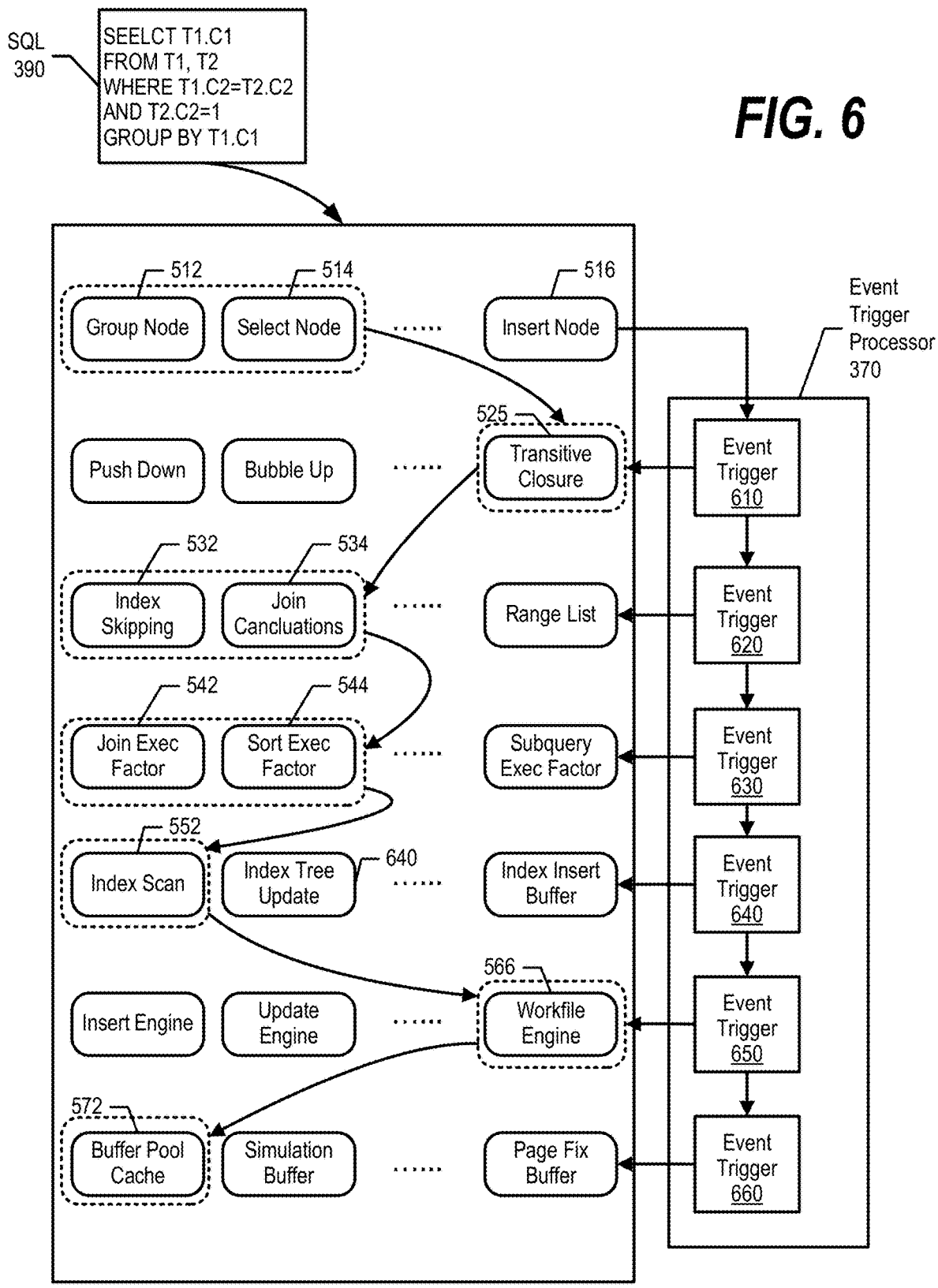
FIG. 6 is an exemplary diagram depicting each function independently processing SQL query 390 and sending results to event trigger processor 370 as training data.

FIG. 6 is an exemplary diagram depicting each function independently processing SQL query 390 and sending results to event trigger processor 370 as training data.

Database system resource balancer 300 receives SQL 390, whereupon group node 512 and select node process SQL 390. Insert node 516 sends an event (event trigger 610) to event trigger processor 370, which proceeds through a series of steps to pre-load images/bundled images of downstream component layers.

Select node 514 calls transitive closure 525 (pre-loaded by event trigger 620), and transitive cluster 525 calls index shipping 532 and join calculations 534 (pre-loaded by event trigger 630). Then, join calculations 534 calls join execution factor 542 and sort execution factor 544 (pre-loaded by event trigger 630). Sort execution factor 544 calls index scan 552 (pre-loaded by event trigger 640), which calls workfile engine 566 (pre-loaded by event trigger 650). In turn, workfile engine 566 calls buffer pool cache 572 (pre-loaded by event trigger 660). As can be seen from the example in FIG. 6, database system resource balancer 300 efficiently processes SQL 390 with minimal overhead.

Figure 7:
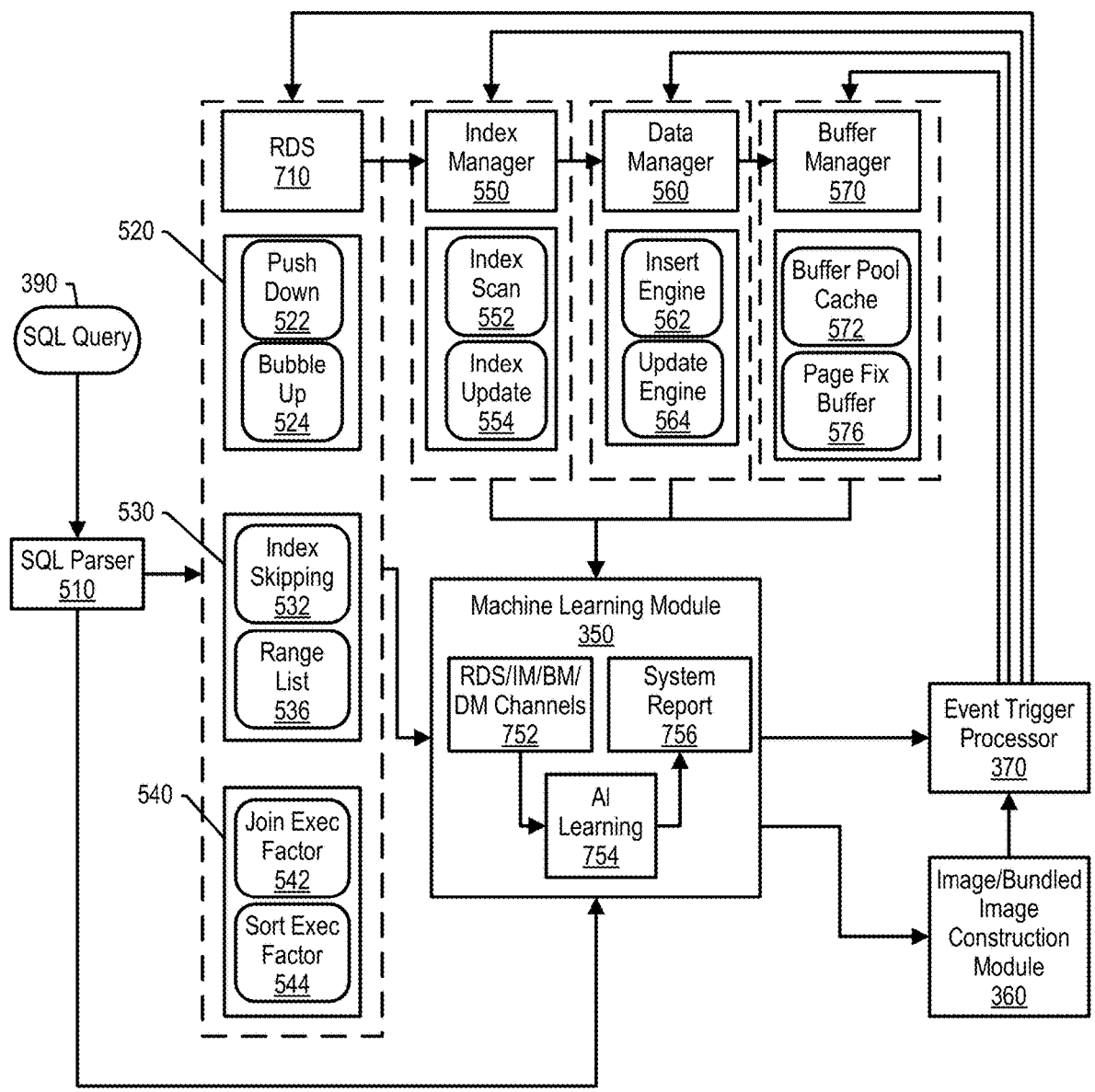
FIG. 7 is an exemplary diagram depicting details of machine learning module 350's involvement and event trigger processor 370's involvement in database system resource balancer 300.

FIG. 7 is an exemplary diagram depicting details of machine learning module 350's involvement and event trigger processor 370's involvement in database system resource balancer 300. FIG. 7 shows SQL parser 510 receiving SQL query 390. SQL parser 510 sends a trigger (insert node 516) to machine learning module 350. Machine learning module 350 helps predict the possible modules of next steps, which feeds into image/bundled image construction module 360.

Then, event trigger processor 370 preloads or activates the possible functions/modules according to machine learning module 350 and image/bundled image construction module 360. Event trigger processor 370 activates relational database service (RDS) 710, index manager 550, data manager 560, and buffer manager 570 accordingly.

RDS 710 invokes query transformation 520, access path selection 530, and runtime execution 540, the results of which are fed back into machine learning module 350. Index manager 550 invokes index scan function 552 and index update function 554, the results of which are also fed into machine learning module 350. Data manager 560 performs insert engine function 562 and update engine function 564, the results of which are also fed into machine learning module 350. And, buffer manager 570 performs buffer pool cache function 572 and page fix buffer function 576, the result of which are fed into machine learning module 350.

Machine learning module 350 receives the results of RDS 720, index manager (IM) 550, data manager (DM) 560, and buffer manager (BM) 570 as RDS/IM/BM/DM channels 752. Channels 752 feeds into AI learning 754, which processes the collective channels as discussed herein. AI learning 754 generates system report 756 that includes predict results indicating which functions are most likely needed at a future time. Machine learning module 350 sends system report 756 to event trigger processor 370 and image/bundled images construction module 360. In turn, event trigger processor 370 evaluates and preloads/activates images/bundled images from image/bundled mage construction module 360 as predicted.

FIG. 8 Is an exemplary diagram depicting an SQL bind-time/run-time stage and a probability preload stage. SQL bind-time/run-time stage 800 shows that SQL bind-time uses the asynchronous event trigger process described herein to generate access paths 1, 2, N, and X and corresponding execution signatures (ES) 1, 2, N, and X in catalog package 805. Execution signatures 1, 2, N, and X are bit maps that indicate which functions to pre-load into database engine 820 at run-time.

When database system resource balancer 300 executes SQL query 390, database system resource balancer 300 generates an access path plan in SQL bind time, then loads and executes the corresponding modules/functions in SQL runtime according to the generated access path plan. A preload function plan is generated in SQL bind time using machine learning module 350 and event trigger processor 370 is responsible for sending the signal to database engine 820, then database engine 820 operates (preloads and executes) in SQL runtime according to the signal.

In addition, during run-time operation, event trigger processor 370 pre-fetches execution signatures based on predictions from machine learning module 350. Then, event trigger processor 370 processor pre-loads functions (1, 2, N) into database engine 820 based on the corresponding execution signature. For example, if machine learning module 350 predicts SQL query 390 needs modules, then machine learning module 350 sends function vector [522, 554, 562] as a signal vector to event trigger processor 370.

Probability preload stage 850 shows event trigger processor 370 receiving time and SQA schema information. In turn, event trigger processor preloads and activates intelligent images in catalog packages 860 based on adding probability (e.g., Naïve Bayes) and using the time and SQL schema as input features.

Figure 9:
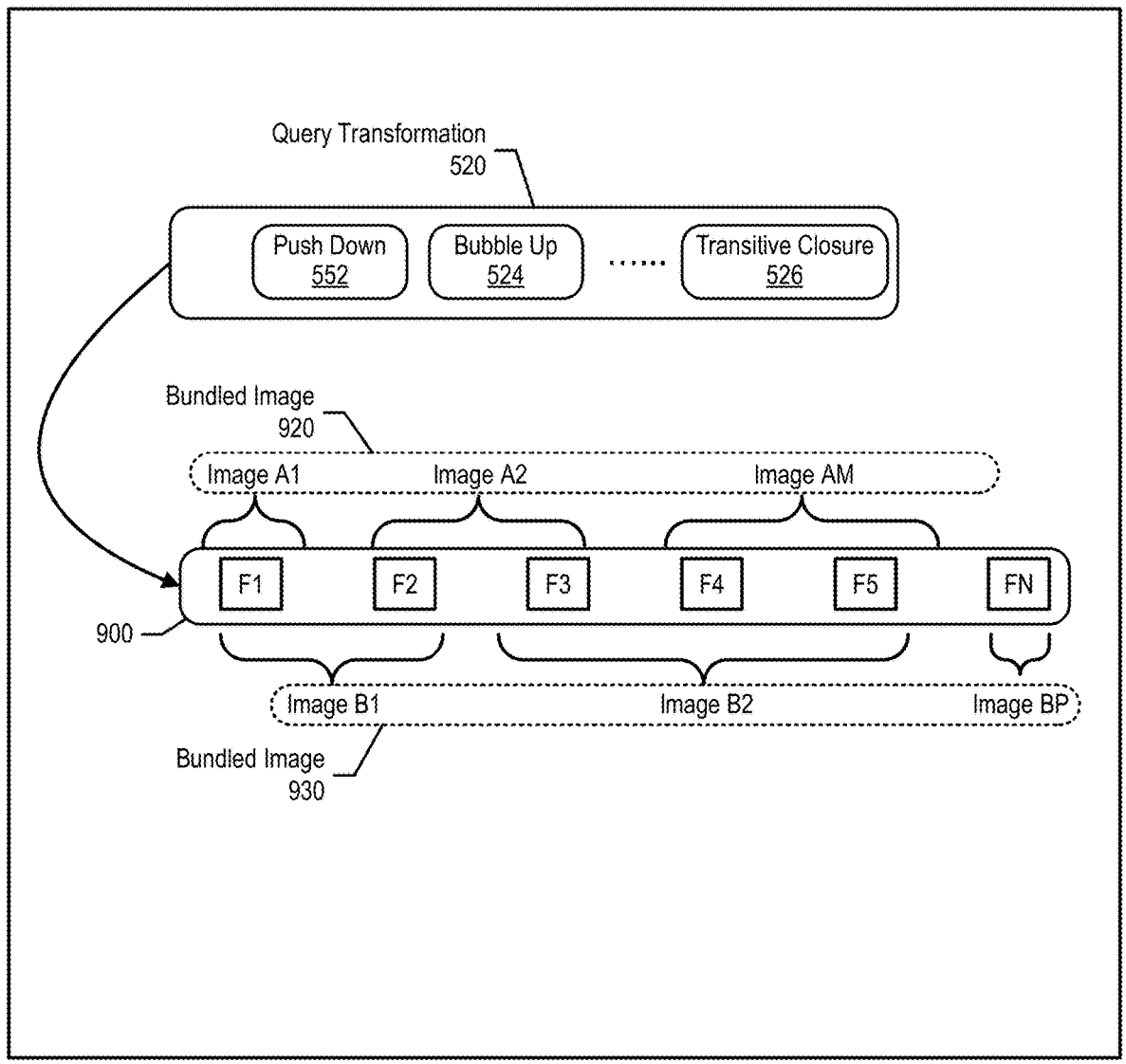
FIG. 9 is an exemplary diagram depicting functions within a component dynamically grouped into different images according to workload pattern analysis to optimize switch load.

FIG. 9 is an exemplary diagram depicting functions within a component dynamically grouped into different images according to workload pattern analysis to optimize switch load. Query transformation 520 corresponds to component 900, which is divided into multiple functions 1, 2, 3, 4, 5, and N. In one embodiment, the images discussed herein are micro-service Docker images and are capable of bundling several functions into a group of functions. In this embodiment, the images in the different bundles may be mapped to different functions within component 900.

Image/bundled image construction module 360 generates images A1, A2, and AM. Image A1 includes function F1; image A2 includes functions F2 and F3; and image AM includes functions F4 and F5. Then, image/bundled image construction module 360 bundles image A1, A2, and AM into bundled image 920.

Image/bundled image construction module 360 also generates images B1, B2, and BP. Image B1 includes functions F1 and F2; image B2 includes functions F3, F4, and F5; and image BP includes function FN. Then, image/bundled image construction module 360 bundles image B1, B2, and BP into bundled image 930.

Database system resource balancer 300 uses different images for different tasks that bundle different groups of functions. For example, database system resource balancer 300 may utilizes bundled image 920 for OTLP (Open Telemetry Protocol) during daytime hours, and utilize bundled image 930 for OLAP (Online Analytical Processing) or batch during nighttime hours.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
segmenting, by a component divider of a database system resource balancer, each one of a plurality of database components in an SQL database system into a plurality of database functions capable of processing an SQL query, wherein each one of the plurality of database components corresponds to one of a plurality of component levels in the SQL database system;
analyzing, by a machine learning module, one or more workload patterns corresponding to one or more historical SQL queries, wherein the analyzing comprises:
identifying a first set of the plurality of database functions segmented from a first one of the plurality of database components corresponding to a first one of the plurality of component levels;
selecting a first database function from the first set of database functions;
identifying a second set of the plurality of database functions segmented from a second one of the plurality of database components corresponding to a second one of the plurality of component levels; and
selecting a second database function from the second set of functions;
in response to the analyzing, combining, into a first image, the first database function and the second database function, wherein the combining is performed by an image construction module of the database system resource balancer; and
invoking the first image to process the SQL query, wherein the invoking comprises asynchronously loading the first database function and the second database function without loading the first database component and the second database component and independently using the first database function and the second database function to process the SQL query.

2. The method of claim 1 further comprising:
creating a different image from a third one of the plurality of database functions;
combining the first image with the different image to generate a bundled image; and
invoking the bundled image to process the SQL query using the first database function, the second database function, and the third database function.

3. The method of claim 2 further comprising:
in further response to analyzing the set of workload patterns corresponding to the one or more historical SQL queries:
creating the bundled image that comprises the first image and the different image; and
creating a different bundled image that comprises a third image and a fourth image, wherein the third image comprises at least one of the plurality of database functions and the fourth image comprises at least one of the plurality of database functions.

4. The method of claim 1 further comprising:
creating a Docker container instance from the first image; and
running the Docker container instance to process the SQL query.

5. The method of claim 1 wherein at least one of the plurality of database components is selected from the group consisting of a parser component, a query transformation component, an access path selection component, a runtime execution component, an index manager component, a data manager component, and a buffer manager component.

6. An information handling system comprising:
one or more processors;
a memory coupled to at least one of the processors;
a database system resource balancer, including a component divider, a machine learning module, and an image construction module;
a set of computer program instructions stored in the memory and executed by at least one of the processors in order to perform actions of:
segmenting, by the component divider, each one of a plurality of database components in an SQL database system into a plurality of database functions capable of processing an SQL query, wherein each one of the plurality of database components corresponds to one of a plurality of component levels in the SQL database system;
analyzing, by a machine learning module, one or more workload patterns corresponding to one or more historical SQL queries, wherein the analyzing comprises:
identifying a first set of the plurality of database functions segmented from a first one of the plurality of database components corresponding to a first one of the plurality of component levels;
selecting a first database function from the first set of database functions:
identifying a second set of the plurality of database functions segmented from a second one of the plurality of database components corresponding to a second one of the plurality of component levels; and
selecting a second database function from the second set of functions:
in response to the analyzing, combining, into a first image, the first database function and the second database function, wherein the combining is performed by the image construction module; and
invoking the first image to process the SQL query, wherein the invoking comprises asynchronously loading the first database function and the second database function without loading the first database component and the second database component and independently using the first database function and the second database function to process the SQL query.

7. The information handling system of claim 6 wherein the processors perform additional actions comprising:
creating a different image from a third one of the plurality of database functions;
combining the first image with the different image to generate a bundled image; and
invoking the bundled image to process the SQL query using the first database function, the second database function, and the third database function.

8. The information handling system of claim 7 wherein the processors perform additional actions comprising:
in further response to analyzing the set of workload patterns corresponding to the one or more historical SQL queries:
creating the bundled image that comprises the first image and the different image; and
creating a different bundled image that comprises a third image and a fourth image, wherein the third image comprises at least one of the plurality of database functions and the fourth image comprises at least one of the plurality of database functions.

9. The information handling system of claim 6 wherein the processors perform additional actions comprising:
creating a Docker container instance from the first image; and
running the Docker container instance to process the SQL query.

10. The information handling system of claim 6 wherein at least one of the plurality of database components is selected from the group consisting of a parser component, a query transformation component, an access path selection component, a runtime execution component, an index manager component, a data manager component, and a buffer manager component.

11. A computer program product stored in a computer readable storage medium, comprising computer program code that, when executed by an information handling system, causes the information handling system to perform actions comprising:
segmenting, by a component divider of a database system resource balancer, each one of a plurality of database components in an SQL database system into a plurality of database functions capable of processing an SQL query, wherein each one of the plurality of database components corresponds to one of a plurality of component levels in the SQL database system;
analyzing, by a machine learning module, one or more workload patterns corresponding to one or more historical SQL queries, wherein the analyzing comprises:
identifying a first set of the plurality of database functions segmented from a first one of the plurality of database components corresponding to a first one of the plurality of component levels;
selecting a first database function from the first set of database functions;
identifying a second set of the plurality of database functions segmented from a second one of the plurality of database components corresponding to a second one of the plurality of component levels; and
selecting a second database function from the second set of functions;
in response to the analyzing, combining, into a first image, the first database function and the second database function, wherein the combining is performed by an image construction module of the database system resource balancer; and
invoking the first image to process the SQL query, wherein the invoking comprises asynchronously loading the first database function and the second database function without loading the first database component and the second database component and independently using the first database function and the second database function to process the SQL query.

12. The computer program product of claim 11 wherein the information handling system performs further actions comprising:
creating a different image from a third one of the plurality of database functions;
combining the first image with the different image to generate a bundled image; and
invoking the bundled image to process the SQL query using the first database function, the second database function, and the third database function.

13. The computer program product of claim 12 wherein the information handling system performs further actions comprising:
in further response to analyzing the set of workload patterns corresponding to the one or more historical SQL queries:
creating the bundled image that comprises the first image and the different image; and
creating a different bundled image that comprises a third image and a fourth image, wherein the third image comprises at least one of the plurality of database functions and the fourth image comprises at least one of the plurality of database functions.

14. The computer program product of claim 11 wherein the information handling system performs further actions comprising:
creating a Docker container instance from the first image; and
running the Docker container instance to process the SQL query.

\* \* \* \* \*